March 25, 1969 W. H. CHANNELL 3,435,124

PEDESTAL AND UNDERGROUND TERMINALS FOR BURIED CABLE SYSTEMS

Filed Feb. 7, 1966 Sheet 1 of 5

INVENTOR,
WILLIAM H. CHANNELL,

BY Calvin Brown,

ATTORNEY

INVENTOR,
WILLIAM H. CHANNELL;
BY J. Calvin Brown,
ATTORNEY

March 25, 1969 W. H. CHANNELL 3,435,124

PEDESTAL AND UNDERGROUND TERMINALS FOR BURIED CABLE SYSTEMS

Filed Feb. 7, 1966 Sheet 3 of 5

INVENTOR,
WILLIAM H. CHANNELL;
BY Calvin Brown,
ATTORNEY

INVENTOR,
WILLIAM H. CHANNELL;
BY Calvin Brown
ATTORNEY

INVENTOR,
WILLIAM H. CHANNELL;
BY Calvin Brown
ATTORNEY 3,435,124
Patented Mar. 25, 1969

3,435,124
PEDESTAL AND UNDERGROUND TERMINALS FOR BURIED CABLE SYSTEMS

William H. Channell, 122 Oak Tree Drive, Glendora, Calif. 91740

Filed Feb. 7, 1966, Ser. No. 525,487
Int. Cl. H02g 9/02
U.S. Cl. 174—38 14 Claims

ABSTRACT OF THE DISCLOSURE

The device is for pressurized and non-pressurized cable systems for both pedestal or direct burial installations. In the pressurized and non-pressurized form a plastic stake is placed upright in a hole in the ground. This stake is open at both ends and carries an axially positioned housing above the ground and separable from the stake. The stake within the same is provided with means to ground the cable sheath comprising a metal terminal and grounding post the upper end of which is received within the housing. The post within the housing is provided with a terminal block and with a plastic cable bundle support. The pressurized form includes the addition of hermetic sealing units at the point of joinder between the housing and the stake thereby preventing communication between the stake and the housing.

The present invention relates to pedestal and underground terminals such as used for television, telephone, and power cables.

An object of the invention is to provide a terminal which substantially reduces the system costs when utilized with buried cable.

A further object is the provision of a pressurized terminal for buried cable wherein the entire housing for the terminal is hermetically sealed and becomes an integral part of a pressurized cable system. With respect to this object, the terminal of the present invention utilizes cable system air pressure and does not require that the cables be potted in epoxy to seal out moisture and insects.

A further object is the provision of a terminal for buried cables of low installation and maintenance cost and which gives high performance.

A further object is the provision of a terminal for buried cable which affords complete accessibility thereto within a minimum of time.

A further object is the provision of a terminal for buried cable which is not subject to aging or deterioration and which is substantially immune to weather such as salt spray, acid or alkali soils, fertilizers, or insecticides or other hostile environment in that the particular terminal is rust and corrosion proof and of low silhouette design to minimize vandalism.

A further object is the provision of a terminal for buried cables of lightweight, high structural and electrical strength, which has excellent dimensional stability, which is so formed and constructed as to eliminate electrolytic and galvanic action, of high insulating property, has a positive grounding and trouble free life.

A further object is the provision of a terminal for buried cable which is designed for use in telephone communication systems, electrical power systems, television transmission systems, street signal systems, fire control systems, and all other systems utilizing underground transmission cables.

Other objects and advantages of the present invention will appear as the specification proceeds, including simplicity of structure, inexpensiveness in cost of manufacture and general superiority to terminals now known to the inventor.

With the above and other objects in view, the invention consists in the novel and useful provision, formation, construction, association, and relative arrangement of parts, members and features, all as shown in certain emobdiments in the accompanying drawings, described generally and more particularly pointed out in the claims.

Figures 1, 2, 3, 7:
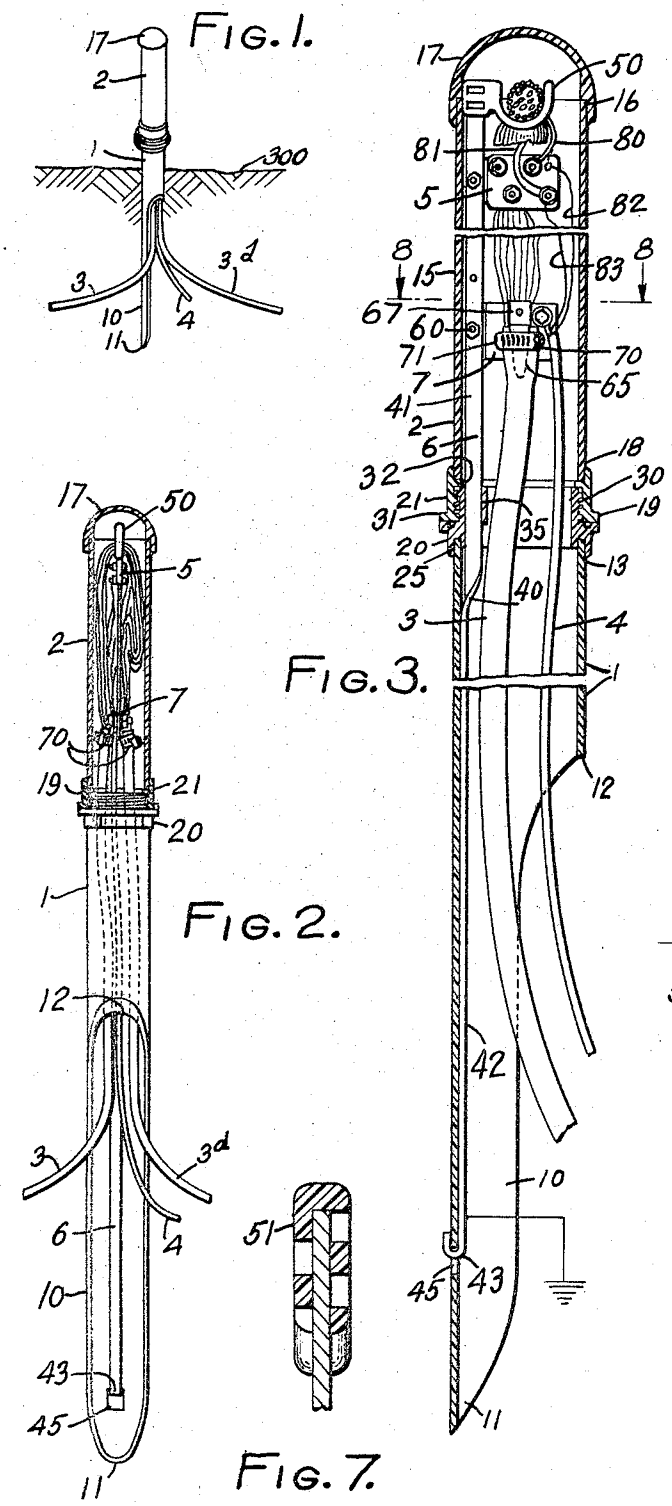
FIGURE 1 is a fragmentary elevation of a pedestal type terminal.
FIGURE 2 is a view similar to that of FIGURE 1, on an enlarged scale with a portion thereof in longitudinal section.
FIGURE 3 is an enlarged longitudinal section of the device shown in FIGURES 1 and 2, the view being axially turned 90° from the showing of FIGURE 2.
FIGURE 7 is an enlarged fragmentary sectional view on the line 7—7 of FIGURE 6.
Figures 21, 22, 23, 24, 25, 26:
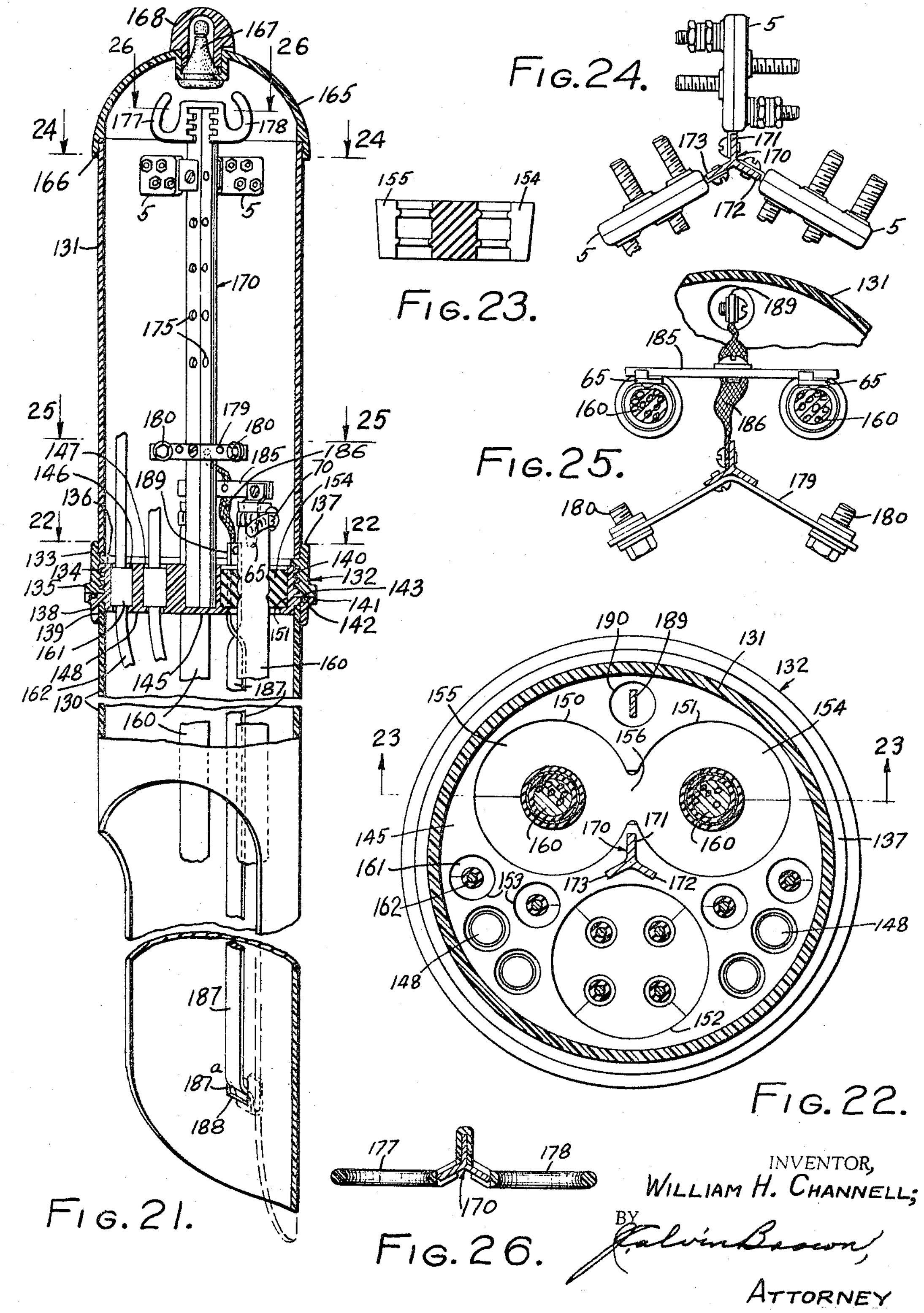
FIGURE 21 is a fragmentary, partially sectional elevation of a pressurized type of terminal.
FIGURE 22 is a sectional view on the line 22—22 of FIGURE 21, and on an enlarged scale.
FIGURE 23 is a sectional view on the line 23—23 of FIGURE 22.
FIGURE 24 is a partially sectional view on an enlarged scale, taken on the line 24—24 of FIGURE 21.
FIGURE 25 is a fragmentary, partially sectional view on an enlarged scale taken on the line 25—25 of FIGURE 21.
FIGURE 26 is a sectional view, on an enlarged scale, taken on the line 26—26 of FIGURE 21.
Figure 27:
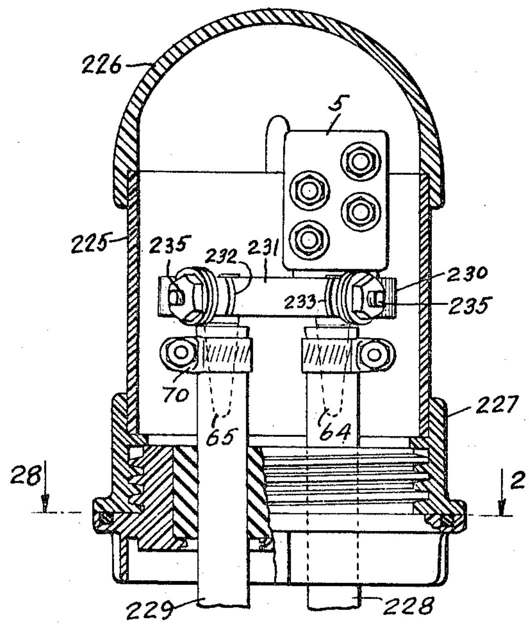
FIGURE 27 is a longitudinal sectional view of a type of terminal adapted to be buried in the ground.
Figure 30:
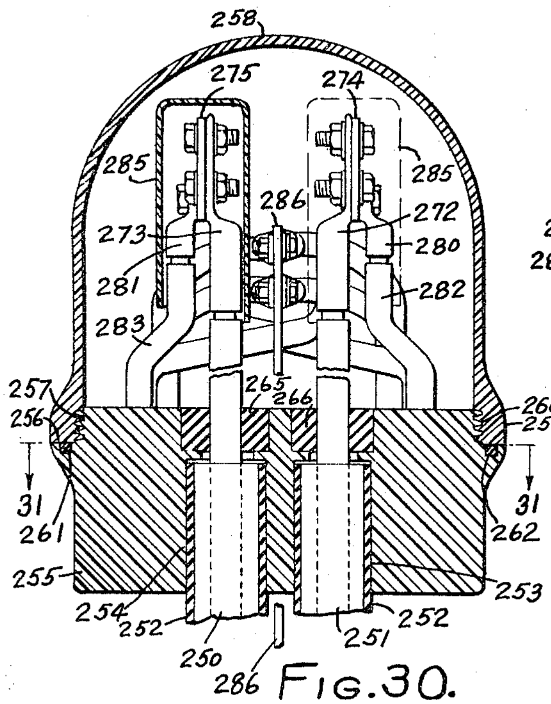
FIGURE 30 is a fragmentary, cross sectional view of a terminal adapted to be buried in the ground for electrical power systems.

Referring to the drawings, I have illustrated my invention in three embodiments, to wit: the unpressurized pedestal terminal shown in FIGURES 2 and 3, the pressurized pedestal terminal shown in FIGURE 21 and the pressurized buried or underground type terminal shown in FIGURES 27 and 30.

The unpressurized pedestal terminal will be described first.

As shown in FIGURE 1 the pedestal type terminal has a portion extending above ground level whereby access to the cable and connectors may be readily made by the installer. The pedestal type terminal is particularly adapted to telephone lines and other lines of communication and includes a stake 1 and a housing cover or cap 2 joined to the stake and coaxial therewith. Within the housing and stake are positioned one or more cables 3 and drop line conductors 4 and other instrumentalities such as terminal block 5, a ground support post 6 and a grounding bracket 7. The terminal block 5, grounding bracket 7 are secured to the ground support post 6. It will be noticed upon viewing FIGURE 3 that the ground support bracket and the upper end of said ground support post are closely adjacent the inner surface of the housing cover or cap.

The stake is tubular and cut longitudinally so as to present an elongated semi-circular portion 10 terminating in a spoon-like parabolic shaped tip 11. In forming the stake it will be observed that a single tube when cut to provide portion 10 will actually form two stakes from a single tube of a given length which length would of course include the upper portion of the stake from point 12 to its terminal upper portion 13.

Figure 5:
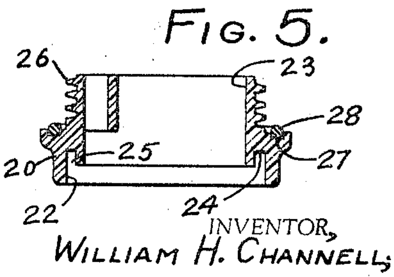
FIGURE 5 is a sectional view on the line 5—5 of FIGURE 4.

The housing cover or cap 2 includes a tubular member 15 to which is secured at the upper end 16 thereof a hemispherical or domelike member 17. The lower end 18 of the tube 15 and the upper end 13 of the stake are secured to an adapter 19. The adapter 19 is in two parts 20 and 21, the part 20 being shown in enlargement in FIGURE 5. Part 20 is annular in form having outer and inner integral tubular portions 22 and 23 of different diameter. The two parts are joined together by annular webbing 24 which provides a circular or annular groove at 25 for reception therein of the upper end 13 of the stake 1. The portion of lesser diameter 23 is externally provided with screw threads 26. The web is formed on its outer surface with an annular groove 27 adapted to receive an O-ring 28. The part 21 of the adapter 19 comprises a connector of annular form internally provided with screw threads 30, a base portion 31 and an internal annular flange at 32. When the two parts 20 and 21 of the adapter are interconnected by the threads 30 engaging the threads 26, the base 31 engages the O-ring 28 while the lower end 18 of the housing 15 engages flange 32. Suitable means is provided for holding the lower end of the housing 2 in engagement with the adapter part 21 and likewise for securing member 20 to the upper end of the stake. The part 20 of the adapter is provided with inwardly projecting stud which is slotted as shown at 35.

Figure 6:
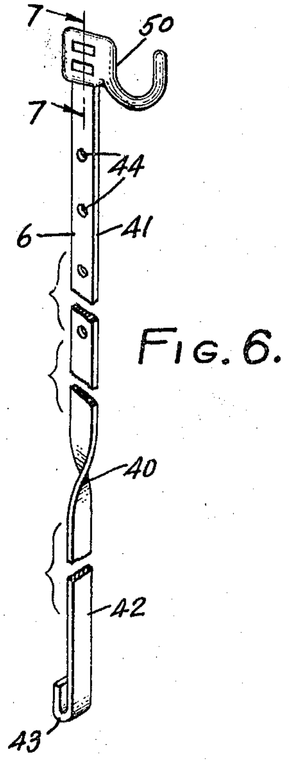
FIGURE 6 is a fragmentary perspective view of a ground support used in the pedestal terminal.
Figure 4:
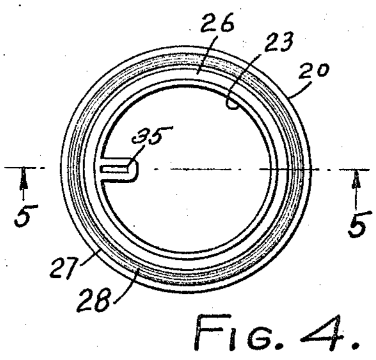
FIGURE 4 is a plan view, on an enlarged scale, of a base or adapter interconnecting the upper and lower portions of the pedestal shown in FIGURE 3.

When the adapter is assembled and is holding the housing cover or cap and the stake in working relationship the ground support post 6 passes through the slot in the stud 35 to hold said support post in position. The support post is formed of metal, preferably stainless steel, of strip form and which has a structural twist as shown in FIGURE 6 at 40 to provide two portions 41 and 42 at 90° angle relationship. For convenience, portion 41 is termed the upper portion of the post while 42 is termed the lower portion. The lower portion is provided with a hook end 43 while the upper portion 41 is provided along its length with a series of transverse holes 44. It is intended that for a given length of ground support post that the stake would be provided with a transverse opening 45 for receiving the hook 43, as shown in FIGURE 3 while portion 41 is passed through the slot of the stud 35. In this manner the ground support post is held in position within both the stake and the housing cover or cap. An insulated support hook 50 is carried by the upper end of the ground support post, the hook portion thereof being positioned substantially centrally or axially of both the stake and the housing, as shown in FIGURE 3.

The hook 50 may be formed from a suitable plastic which is carried by the upper end of part 41 of the ground support post. The hook 50 projects from a closed end flat sleeve 51, the sides of the sleeve are sloped for molding purposes and the sleeve and hook are formed from insulation material. A plastic satisfactory for this purpose is known as A.B.S. which is acrylonitrile-butadiene-styrene. This plastic has high tensile strength, is resistant to strong acids, alkalies, greases and oils, water and sunlight. Other plastics may be employed as is self-evident.

Figure 8:
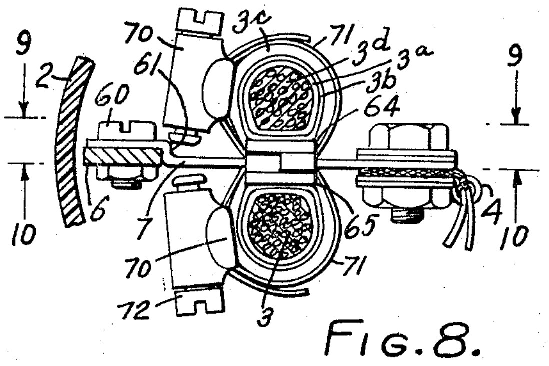
FIGURE 8 is a fragmentary partially sectional plan view looking in the direction of the arrow 8 of FIGURE 9.

In the non-pressurized type of pedestal terminal, the cable 3 is extended within the open portion of the stake and upwardly within the housing cover or cap 2 as shown in FIGURE 3. In the type of cable shown the core, FIGURE 8, consists of a number of wires which have colored insulation for identification purposes with the core surrounded by inner insulation sheath 3*a*, a metal shield 3*b* surrounding the sheath 3*a* and a further insulation sheath 3*c* known as the outer sheath. This leaves a long core of wires which are looped over the hook 50, as shown in FIGURE 2, with a sheathed cable return 3*d*. Certain wires from the cable may be selected and these wires are connected to terminals carried by the terminal block 5. As a rule, the insulation of the wires of the core is not removed as the terminal block is adapted to have the wires wrapped around certain posts between washers which when nuts carried by the posts are tightened, cuts through the insulation, as hereinafter described in the description of the terminal block as it appears in FIGURES 14 to 20 inclusive of the drawing. The grounding bracket 7 comprises a metal plate one end of which is transversely bored with a bolt or machine screw 60 passed therethrough and likewise through one of the openings 44 of the ground support post, as best shown in FIGURE 8. This bolt carries the usual nut so that the assembly may be maintained in tight engagement and it will be noted that the plate has an offset end at 61. This prevents the plate from tipping when fastened by the bolt to the ground support post 6. The pair of cable shields and its sheaths are secured to the ground support bracket to support the cables within the pedestal. In this construction I provide a pair of prongs 64 and 65 of identical construction and each includes an elongated taper sided member 66, a perforated plate 67 and an offset connecting piece 68 between said plate and the member 66. The plate 67 is provided along its top edge with a flange which is at a right angle to the plate as shown at 69. The prongs 64 and 65 are secured to the grounding bracket 7 by passing bolts through the openings of the plates 67 and securing the bolts by nuts. It will be noted that the flange 69 extends a half length of the plate 67 and the members 66 on both sides of the grounding plate are thereby stabilized and maintained in parallel position and alignment when engaging the top edge of the grounding plate 7. The cables in each instance are held secured to the grounding plate by forcing the members 66 of each prong member between the outer sheath and the metal shield for the length of each member 66 until the offset portion 68 abuts the top of the cable sheath. Adjustable clamps of the usual form and designated as 70 surround the outer sheath of each cable, so that when the clamps are tightened, each cable is secured to a prong member 66 against movement. The clamp 70 includes the usual metal strip 71 for surrounding the cable sheath and means 72 for tightening the strip in its engagement with the outer cable sheath. Certain of the service wires from the cable loop are preselected and secured to the terminal block 5, as shown at 80 and 81.

The drop line conductors 4 include the conductors 82 and 83 which connect to the terminals of the terminal block for connection with wires 80 and 81. The drop line conductors are enclosed within a sheath of insulation material surrounded in part with a shield, which shield is fastened to the grounding bracket 7 by bolt and nut combination. It is not intended that the wires 80 and 81 should be cut but looped about bolts carried by the terminal block and nuts, which when tightened on the bolts, will cut the insulation from the wires 80 and 81 to allow connection with the metallic wires of said cable.

The terminal block 5 utilized in the present invention is detailed in FIGURES 14 to 20.

Figure 15:
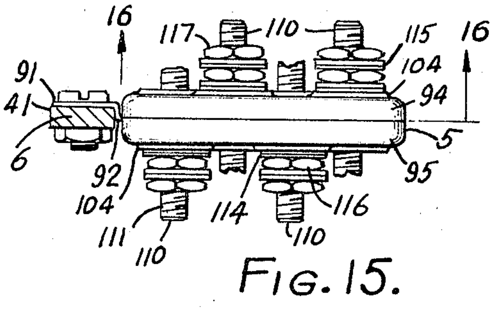
FIGURE 15 is a fragmentary, partially sectional edge view of the block shown in FIGURE 14.
Figure 16:
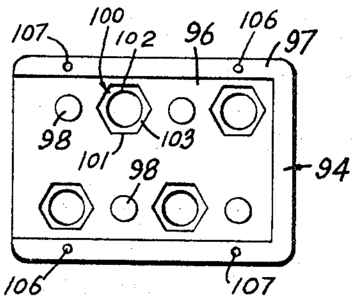
FIGURE 16 is a portion of the terminal block taken on the line 16—16 of FIGURE 15.
Figure 17:
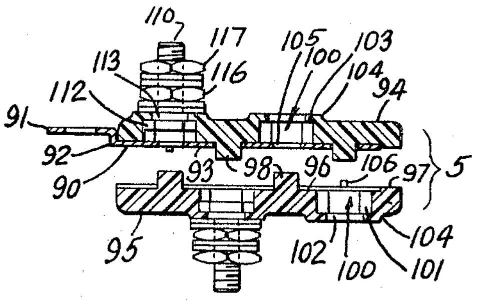
FIGURE 17 is a sectional view on the line 17—17 of FIGURE 14, parts thereof being shown separated.
Figure 18:
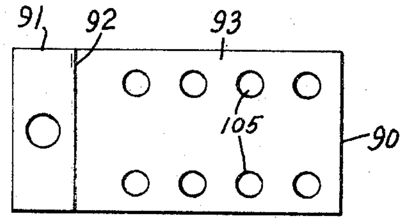
FIGURE 18 is a side elevation of a plate used between two side members of the terminal block, as shown in FIGURE 17.
Figure 19:
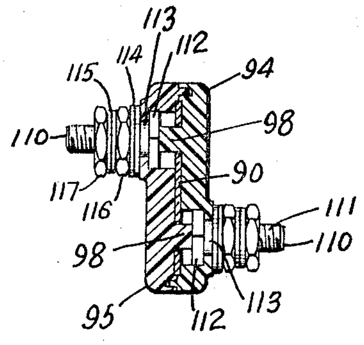
FIGURE 19 is a transverse sectional view on the line 19—19 of FIGURE 14.
Figure 20:
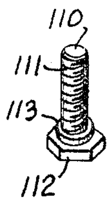
FIGURE 20 is a perspective view of a screw used in the terminal block, as shown in FIGURES 17 and 19.

Referring specifically to FIGURES 14 to 20 inclusive, the terminal block includes a metallic grounding plate 90 formed from suitable material such as stainless steel and which plate 90 has an offset end 91 providing a shoulder at 92. The main body 93 of the plate is adapted to be interposed between insulation plates 94 and 95 with the offset end 91 extending beyond one end of the insulation plates and with the portion 93 totally enclosed between said insulation plates. Thus, each insulation plate is provided with a flat recessed face 96 surrounded on three sides with an encircling flange 97. The recessed face of each insulation plate is provided with spaced, laterally extended studs 98. In the present embodiment upper and lower studs are provided and arranged in offset relationship as shown in FIGURE 16. Each insulation plate is provided with spaced apart bores or holes 100 which may lie intermediate the studs and the flange as shown in FIGURES 16 and 17. The holes 100 are of a particular form or outline in that 101 is a countersunk portion in communication with a reduced diameter hole at 102. This construction provides an annular shoulder at 103 and all holes as well as the shoulder are concentric. It is to be observed that an annular boss 104 extends above the outer surface of the plates 94 and 95 and surrounds the hole 102. In the assembly, the grounding plate 90 is provided with transverse bores or holes 105 and the grounding plate is adapted to be fitted within the recessed portion 96 of each insulation plate with the studs 98 projecting through said holes. When the insulation plates are secured together with the grounding plate therebetween, it will be noted that the studs 98 are concentric with the bores 100, in each instance, and are received within said bores as illustrated in FIGURE 19. To provide proper mating between the assembled plates I provide index pins 106 extending from the encircling flange 97 for reception in index openings 107 in said flange, see FIGURE 19. Electrical conducting posts designated generally as 110 are received in and extend from the bores 100. The electrical conducting posts are of the type shown in FIGURE 20 wherein machine screw 111 is provided with a hexagonal flat head 112 with a surrounding annular collar 113 between the hexagonal head and the machine screw shank. Accordingly, the bore 101 is of hexagonal form to receive the hexagonal head 112 and the annular collar 113 fits within the circular bore 102. The hexagonal head 112, is spaced from the grounding plate 90 and the hexagonal head is held against the annular shoulder 103 by the insulation studs 98 when the plates are in assembly. The machine screw shank extends beyond the annular boss 104, as shown in FIGURES 15, 17 and 19. The machine screw in each instance carries pairs of washers 114 and 115 and nuts 116 and 117. It is to be noted that the terminal posts in each instance have the hexagonal heads spaced from the grounding plate and by way of illustration the air gap to ground ratio in the embodiment shown is in excess of 3000 volts. The terminal block can be of any size although the one described is a protected four pair terminal block, and, as previously stated, the wires from the cable shown at 80 and 81 are usually insulated by a thin plastic. Wrapping each insulated wire around a post or machine screw between pairs of washers followed by tightening the nuts such as 116 and 117 makes a service connection as the thin plastic insulation is abraded and the wire exposed for contact with the post.

The pedestal type pressurized terminal is shown in FIGURE 21 and elements thereof in FIGURES 22 to 26 inclusive. In FIGURE 21 I have shown a stake or anchor post 130 and a housing 131 similar in construction to the stake 1 and housing 2 shown for the non-pressurized terminal in FIGURE 3. An adapter indicated generally as 132 interconnects the housing with the stake. The adapter 132 is similar to the adapter 19 shown in FIGURE 3 save and except that the adapter 132 is constructed and arranged to allow pressurization of the housing 131. The adapter 132 is in two parts, part 133 being internally screw threaded at 134 and provided with an external base flange 135. The part 133 is provided with an internal flange or shoulder 136 positioned downwardly from the upper end 137 of said part. The housing 131 in the present instance is shown as tubular with the lower end thereof resting upon the flange or shoulder 136 and the housing and part 133 may be solvently welded together as both the housing 131 and the adapter are preferably formed from a plastic having a high impact strength such as the A.B.S. plastic heretofore named. The second part 138 of the adapter is so formed as to be annularly grooved at 139 to receive the upper end of the tubular portion of the stake 130 and the parts are bonded together by a solvent weld. Part 138 is externally screw threaded at 140 for engagement with the threads 134 of part 133 and part 138 has an external flange 141 provided with a groove 142, the groove adapted to receive an O-ring 143. The construction so far is similar to that shown for the adapter of FIGURE 3 in that the base member of part 133 engages the O-ring for tight sealing engagement between the two parts of the adapter. However, part 138 is provided with a base 145 so constructed and arranged as to provide transverse cylindrical openings which extend from the top of the base 145 and terminate above the lower surface thereof as shown in FIGURE 21 at 146 and 147. Knock-out portions are provided between the lower surface 148 and each bore or cylindrical openings so that the cylindrical opening does not extend entirely through the base unless a knock-out has been removed. The cylindrical openings may assume various cross sections and be of different diameters as shown best in FIGURE 22 wherein three openings are shown at 150, 151, and 152. It will be noted that the openings 150 and 151 intersect so as to communicate with each other while the opening 152 lies intermediate the openings 150 and 151. Other openings of smaller diameter are shown at 153 for a series of four openings interposed between the openings 150, 152 and 151. It is intended that the openings should receive split grommets as shown in FIGURES 21 and 22 at 154 and 155, the latter grommets being interconnected by an intermediate portion 156 while opening 152 receives a grommet which may accommodate drop wires. Both the openings and grommets may be tapered so as to provide for a tight fit and the split grommets 154 and 155 surround lengths of cable 160, the wire core of which is adapted to be looped over a hook. Preferably the grommets closely embrace the cable sheath both for the entrance cable and the return cable in the manner described for FIGURE 3 and in this particular the grommets 154 and 155 are internally provided with O-ring portions for a tight grip engagement with the external cable sheath to prevent a gas or liquid leak between the cable sheath and the grommet. The grommet construction and its engagement with the cable sheath is illustrated in FIGURE 23. The smaller openings 153 receive grommets of the type shown in FIGURE 21 at 161. These grommets are similar to the grommets 154 and 155 in that they are split and internally provided with O-ring portions of the type shown in FIGURE 23 and adapted to be placed within the openings 153 in tight engagement with the walls of said openings and to tightly grip the sheaths of wires passed through said grommets and outwardly from the base 145, as shown in FIGURE 21. Thus so-called drop wires designated generally as 162 pass through the grommets 161. Hence, as so far described, it is evident that the housing 131 may be gas pressurized and the gas pressure maintained as there will be no gas leak from the housing around the cables or the drop wires into the stake. In this regard, the housing carries a dome type cap 165, similar to the cap 17 which cap 165 is secured to the upper end of the housing 131 at 166 by a solvent weld. The cap 165 is provided with a pressure access valve 167. This valve is similar to tire valves now in general use and the valve is enclosed by a valve cap 168. Removal of the cap allows access to the valve.

FIGURE 21 illustrates one form of support post 170 having three wings 171, 172, and 173, the wings being spaced apart at an angle of 120°. The base 145 is provided with complementary angular grooves for receiving the lower end of said support post. Each wing of the support post 170 is provided throughout its length with spaced transverse holes designated generally as 175 and terminal blocks 5 are secured to each wing by means of bolts or machine screws as previously described for the showing of FIGURE 3. I have shown three terminal blocks secured to the wings in FIGURE 24. The upper end of the support post 170 carries an insulated support hook structure which may comprise two or more hooks, and in the present instance two hooks, as shown in FIGURE 26 at 177 and 178. The support post 170 carries a bracket 179 having two arm portions fitted between two wings of the support post as shown in FIGURE 25. The bracket 179 is provided with terminal posts 180.

Figure 13:
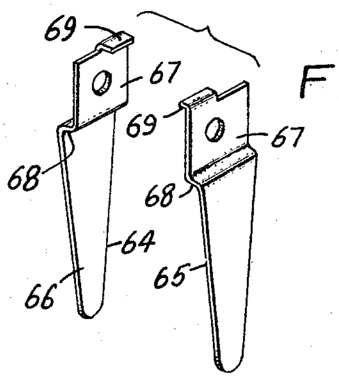
FIGURE 13 is a separated and perspective view of prong elements used in the practice of the invention.

The cable 160 has its sheaths and shield cut at two spaced points to expose an intermediate length of cable wires to be looped over one of the hooks shown at 177 and 178. Hence the cable has an entrance portion and an exit portion between the loop and clamps surround each cable length at the sheath portions as shown in FIGURE 21 and previously described for FIGURES 3, 8 and 9. A bar 185 carries a pair of spaced apart prongs of the type shown in FIGURE 13 at 64 and 65. The prongs in each instance are passed bewteen the outer sheath and the metal shield for each cable and clamped to hold the prongs in position and to make contact with the metal sheath. The bar 185 in turn is grounded to the support post 170 by braided wire connector 186 and which connector in turn is secured to a ground post 187 similar in construction to the post 6 shown in FIGURE 6. This ground post is of metal and is internally secured to the stake 130 one end of said post being returnedly bent at **187*a* and passed through a transverse opening 188 in said stake. An upper end portion 189 of said ground post is passed through a grommet within a bore 190 of the base 145 and the braided wire 186 is secured to that portion of the ground post which is received within the housing 31. Selected cable wires may be attached to the terminal blocks and it is evident that this type of construction will allow many wires to be utilized and connected with drop wires as each of the terminal blocks will terminate four pairs of wires. The pedestal type pressurized terminal just described may be maintained pressurized by directing gas pressure through the cable which will thereby pressurize the interior of the housing. Any leak within the housing is easily indicated at a station and the particular pressurized terminal can be readily located and tests made through the medium of the pressure access valve 167**.

Figure 9:
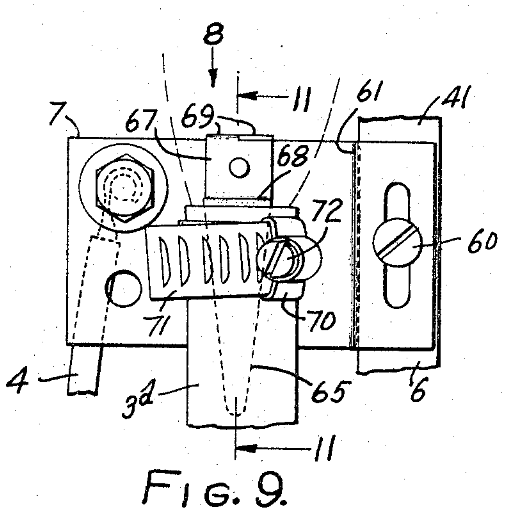
FIGURE 9 is a fragmentary side elevation looking in the direction of the arrows 9—9 of FIGURE 8.
Figure 10:
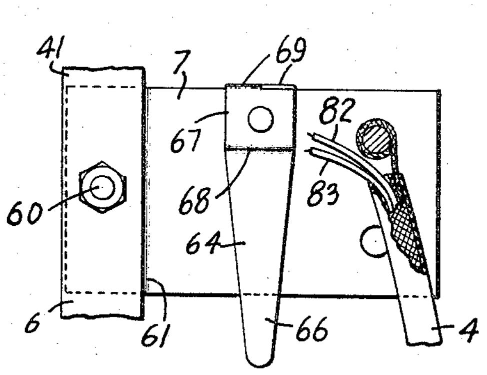
FIGURE 10 is a fragmentary, partially sectional view looking in the direction of the arrows 10—10 of FIGURE 8.
Figure 11:
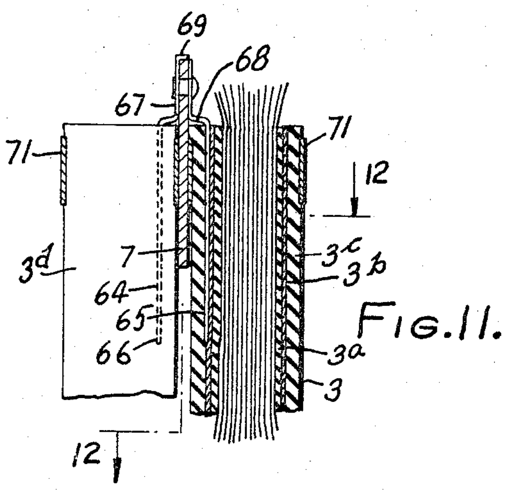
FIGURE 11 is a fragmentary sectional view on the line 11—11 of FIGURE 9.
Figure 12:
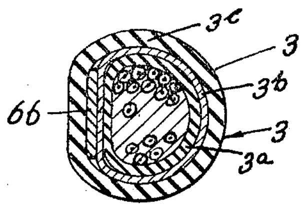
FIGURE 12 is a sectional view on the line 12—12, and on an enlarged scale.
Figure 14:
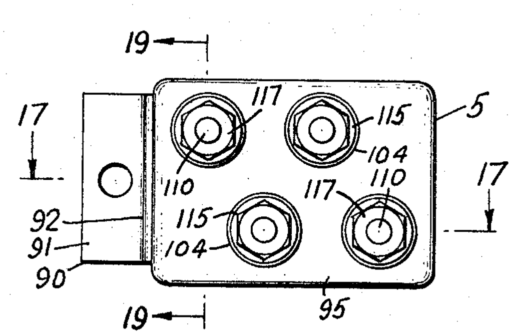
FIGURE 14 is a side elevation of a terminal block used in the invention.
Figure 28:
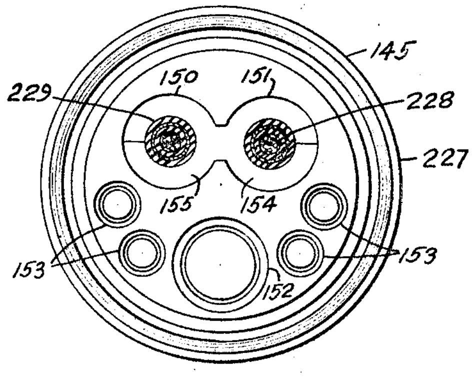
FIGURE 28 is a sectional view on the line 28—28 of FIGURE 27.

FIGURES 27 and 28 are illustrative of a pressurized underground terminal. This type of terminal may be buried within an opening in the ground so as not to be visible above the ground as is the case for the pedestal type terminal. The underground or buried pressurized terminal is similar to the pressurized pedestal type terminal of FIGURE 21 in that it includes a cylindrical housing 225 provided at its upper end with a bell or dome type cap 226 similar to the cap 17 of FIGURE 3 and an adapter type base 227 similar to the adapter 132 shown in FIGURE 21. Accordingly, the numbers as applied to the adapter of FIGURE 21 will be applied here. Thus, the base 145 is provided with interconnected pockets 150 and 151 for receiving grommets 154 and 155 and, likewise, with the pocket or bore 152 for receiving a large grommet which may accommodate multiple wires. Also, there are pockets or bores similar to 153. As before, the cable has outer and inner shields cut to provide two lengths 228 and 229 with a loop of cable wires, certain wires of which are to be connected to the posts of a terminal block 5. The terminal block in the present instance is secured to a bracket arm 230 of the type shown at FIGURE 29. The bracket arm includes a straight bar 231 having secured thereto a pair of spaced apart prongs of the type shown at 64 and 65 of FIGURE 13, and the bracket is bent relative to part 231 to provide two converging arms 232 and 233. The arms 232 and 233 may be transversely bored as indicated at 234 to accommodate posts 235. The terminal block 5 may be secured to the bracket by the screw 236 which secures the prong 65. As before, the prongs are interposed between the outer sheath and the metal shield of each length of cable 228 and 229, and when cable clamps of the type shown at 70 of FIGURES 8 and 9 are in position, the bracket and the terminal block is held in position of service. As before, the bores or pockets in the base 145 have knock-out portions and after the cables have been passed through the pockets or openings into the housing 225, the grommets may be positioned within said pockets to surround the cables and maintain the interior of the housing pressure tight. The cable wires may be looped without the necessity of providing any insulated support hooks of the type shown at 50 in FIGURE 6 and at 177 and 178 in FIGURE 21. As previously stated, no particular type of ground rod or ground support post is essential for this type device as it is adapted to be buried within the ground.

Figure 31:
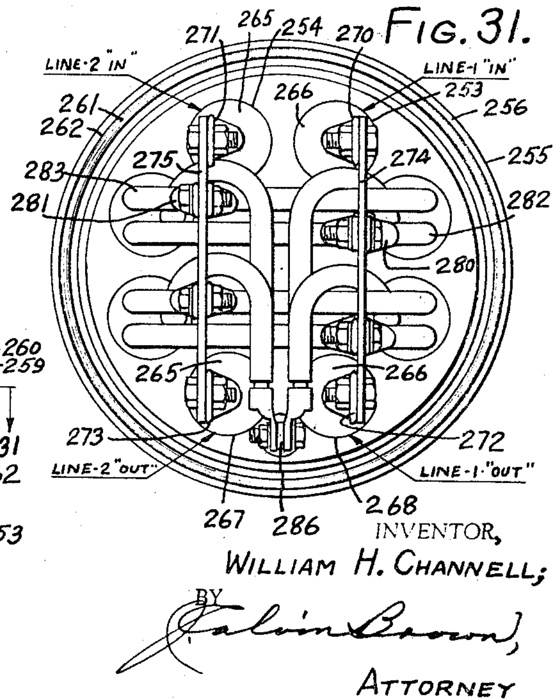
FIGURE 31 is a sectional view on the line 31—31 of FIGURE 30.

An adaptation of the invention for power purposes is shown in FIGURES 30 and 31 and wherein buried power cables are brought within the underground terminal for connection with house service lines. Referring to FIGURES 30 and 31, 250 and 251 represent power lines such as primary lines which are duly insulated by outer sheaths designated generally as 252, the sheaths passed upwardly through the transverse bores 253 and 254 of a base member 255 formed of insulation material such as A.B.S. plastic heretofore mentioned and which material is so formed as to provide an external annular shoulder or ledge 256. The base is threaded at 257 for connection with a housing member 258 of dome form. The external portion of the housing is enlarged at 259 and internally screw threaded at 260 for connection with the threads 257. When the housing is threaded to the base, part 259 bears against an O-ring 261 within an annular groove 262 of the ledge for the purpose of having an air tight fit between the housing and base.

The primary lines 250 and 251 are received within the housing and passed through grommets 265 and 266. The grommets are of the form which have previously been described and shown in FIGURES 22 and 23 so as to assure a tight fit and one that will not leak moisture into the housing around the lines 250 and 251. The primary lines 250 and 251 represent in FIGURE 30 the lines entering through the openings of the base into the dome of the housing. The base 255 is provided with other transverse bores such as shown in FIGURE 31 at 267 and 268 which illustrates openings for lines leading outwardly from the housing. Openings 267 and 268 also receive grommets like that shown at 265 and 266 and the wires entering and leaving the housing are termed lines 1 and 2 "in" and lines 1 and 2 "out". Both lines 1 and lines 2 "in" are secured to separate terminals 270 and 271 and terminals 270 and 271 are duplicated for both lines 1 and lines 2 leading out from the housing as shown at 272 and 273. Buss bars 274 and 275 are connected with the terminals 270, 271, 272 and 273 and suitable terminals 280 and 281 of which there may be a number are connected to the buss bars and to the service lines such as shown at 282 and 283 in FIGURE 30. The terminals such as 270, 271, 280, and 281 are protected by insulation caps of the type depicted at 285. A neutral or ground connection is provided at 286 with terminals connecting the same with wires which lead both within the housing and to the house service. All openings in the base 255 receive grommets such as 265 and 266 so as to provide a pressure seal at this point with the wires and with the base through which the wires are passed.

The operation, uses and advantages of my invention are as follows.

Referring to that form of the invention illustrated in FIGURES 1 to 3 inclusive, the stake is not driven into the ground but rather a hole is provided in the ground for receiving the stake and so that the stake at the adapter cap portion is situated a slight distance above ground level 300. This construction allows ready access within the pedestal for work upon the cable wires such as connecting house lines or drop wires to cable wires which are received within the housing. A ground connection is made by means of the ground support post 6 which extends upwardly through the stake and into the housing. After a stake has been placed in position within a hole, the installer may remove the housing cover or cap to expose the interior thereof so that an incoming and outgoing cable such as 3 and 3*d* may have the sheath and metal shield so cut as to provide a cable wire loop of a certain length. A ground bracket such as shown at 7 is secured to the ground support post and the incoming and outgoing cable members are held on opposite sides of the ground bracket 7 by the prong members 64 and 65 positioned on opposite sides of the grounding bracket with the prong received between the exterior sheath and the metal shield of the cable followed by clamping each assembly as shown in FIGURE 8. The loop of cable wires is passed over the insulated hook 50 and certain cable wires are selected for connection with the posts on the terminal block 5 and in turn for connection with drop wires leading to a house or other building, by way of example. After the connections have been made the housing is secured to the stake by the adapter.

If an overcharge should occur the terminal block construction as depicted in FIGURE 14 to 20 inclusive readily handles the charge and carries the charge to the ground as the metal plate 90 of the terminal block is connected to the ground support post 6. Damage to the service lines does not occur as the head of each machine screw or bolt is held by the insulation plates 94 and 95 spaced from the grounding plate as shown in FIGURE 17 and 19. In actual practice the air gap to ground is in excess of 3000 volts. From the statement so far given, it is seen that the grounding procedure of the present invention is quite simple and requires the minimum of time for service, for the reason that after the prongs are received between the outer sheath and the shield and clamped, no further procedure is necessary such as by the use of clips, or taping.

It is often necessary to load certain of the lines which is accomplished through the use of coils of small size for the purpose of increasing the volume of sound, the loading coils are easily attached to the terminal block with wires leading therefrom to the drop wires leading to the house or other building.

One important feature of the present invention consists in the number of cables that may be accommodated within the pedestal as well as the number of pairs of wires in said cable or cables.

In the pressure form of the pedestal terminal as shown in FIGURE 21, the adapter is so formed as to have the base of one member relatively thick and provided with bores or pockets leading to knock-out portions. The different bores are adapted to receive grommets and when the knock-outs are removed to accommodate wires and cable, the grommets tightly engage the outer sheaths and the walls of the holes or openings therefor to provide a pressure tight fit with the cables. The form of the pressurized pedestal terminal is such that it may accommodate, in accordance with diameter thereof, up to one hundred pairs of twenty-two gauge wires, and provide three cable entrances as shown in FIGURE 22 with one to eight service drops of the type shown at 162 and with the arrangement of the terminal block such as shown in FIGURE 24 to terminate and protect eight pairs of twenty-two gauge cables with space available to load up to six pairs of cable. The form of the pressurized pedestal terminal is such that the cable may enter the housing to maintain the interior of the housing at a given pressure. This pressure may be readily determined exterior the housing without removing the housing from the adapter by means of the pressure access valve 167. When the cap is removed, a pressure gauge may determine the pressure within the housing and if there is a leak to be repaired. The only difference in the pressurized pedestal terminals will be in the diameters and the intended number of pairs of cable to be accommodated as well as the number of cables which are to be received in the housing. Also the diameters of the cable and the overall heights of the pedestal type terminals is variable such as from 58" to 65" with larger size pedestal terminals accommodating as high as 400 pairs of 22 gauge cable and up to 12 service drops and the loading of more than 75 pairs of the cable.

Figure 29:
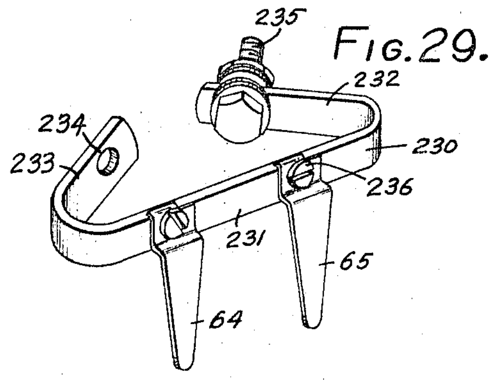
FIGURE 29 is a perspective view of grounding means for cable.

The construction, including the adapter and housing, lends itself to power units for buried cable and the same buried form of the invention may be used for communication purposes as shown in FIGURES 27, 28, and 29. In the form of the invention shown in FIGURES 27 to 29 inclusive, a ground support rod is not utilized for the reason that the assembly is already buried in the ground.

It is important to note the form of the invention particularly shown in FIGURES 21, 23, 27 and 30, renders the interior of the housing moisture proof and still allows easy access to the cable terminals within the housing. The stake and housing may be in communication and open as shown in FIGURE 3 if it is not important that the terminals within the housing be protected against moisture. If, however, moisture is a factor, to prevent rust or corrosion of the terminals within the housing particularly when the terminals are used for toll or exchange cable, both in aerial and underground applications, that the housing be sealed. Thus the adapters with pockets to receive grommets are so arranged, as has been described, to seal the cable, as shown in FIGURE 30, so that moisture cannot enter between the core and the sheath or between the cable core and the adapter base. However, the housing is readily removable from the adapter base for installation of cables or inspection of other elements with which the cable core is associated.

This is the reason that the special type of housing, in one instance its adapter base and pedestal is used in the practice of the invention in the several forms shown and described.

I claim:

1. A terminal for cables of the type in which the cable has a core of insulated wires, external and internal insulation sheaths and a metal shield between the insulation sheaths surrounding the cable, the cable being cut to provide two separate insulation sheaths and metal shields with the core of wires in continuous form extending in a loop therebetween to provide an incoming and an outgoing core of wires including: a housing formed of insulation material, closed at one end and open at its opposite end, a stake formed of insulation material and means interconnecting one end of the stake with the open end of the housing, a metallic ground support post extending between the housing and the stake and provided at an end thereof adjacent the closed end of the housing with an insulated hook, the cable adapted to enter through the stake and into the housing with the core thereof adapted to be looped over said hook, a terminal block within the housing for connection with selected wires of said cable core, a grounding bracket secured to the ground support post and means connected to the grounding bracket for supporting the cable by the grounding bracket.

2. The device as set forth in claim 1, said stake having a tubular portion and a semi-circular portion, the later portion adapted to be placed within the ground and for maintaining the terminal upright.

3. The device as set forth in claim 2: said stake having a tubular portion which connects with the means interconnecting the housing and the stake, the housing and the semi-circular portion terminating in a spoonlike tip exposing the interior of the stake.

4. A pedestal type cable terminal, including: a housing provided at one end with a cap and open at its opposite end, a stake, an adapter joining the open end of the housing with the one end of the stake, said stake having a tubular portion joining a semi-circular open portion, the stake adapted to be received within a hole in the earth for grounding the stake through said semi-circular portion, said adapter being formed in two parts one part of which is secured to the open end of the housing and the other part of which is secured to the tubular portion of the stake, said two parts of the adapter formed to be threaded together and gasket means between said parts; the adapter part secured to the stake having a closed base provided with pocket portions opening within the housing and each pocket portion having a knock-out portion; cable for said terminal adapted to be passed through the knock-out portion and into the housing through said pocket, and grommets within each pocket and adapted for pressure fit engagement with the cable.

5. The device as set forth in claim 4, a support post within the housing and carried by the adapter, a ground post within the stake and extending into the housing and means grounding the support post to said ground post.

6. The device as set forth in claim 4, said closed end of the housing provided with a pressure access valve.

7. A terminal block including, two insulation plates, a metallic plate interposed between said insulation plates, a binding post extending from each insulation plate, each binding post including a machine screw having an angular sided flat head and each insulation plate formed with an angular sided bore receiving the angular sided flat head.

8. The device as set forth in claim 7, and each insulation plate formed with a stud passed through the metallic plate and received in the angular sided bore of the adjacent insulation plate engaging the angular sided flat head of a binding post and maintaining the flat head spaced from the metallic plate.

9. A terminal for cable of a type which includes a core of insulated wires and a surrounding metal shield and insulation sheaths for said core the cable sheaths being cut to expose a loop of the cable core, including: a housing having a closed and an open end, an adapter base on the open end of the housing, said adapter base having a part carrying a seal engaged with the open end of the housing to maintain the housing in pressure tight engagement with said adapter base, said adapter base being formed with pockets allowing entrance and return of a cable through said pockets and within the housing; grommets in the pockets in pressure tight engagement with the pockets, a bracket arm provided with a pair of prongs, the prongs adapted for interposition between the metallic shield for each cable length and the insulation sheath, a terminal block carried by a bracket arm, and the cable loop having wires for connection with said terminal block and drop wires leading from the terminal block and through the adapter base in pressure tight engagement therewith.

10. The device as set forth in claim 9, and means for surrounding the cable sheath and clamping the prongs in position.

11. A pedestal type cable terminal wherein the cable has a core of insulated wires surrounded by insulation sheaths and a metallic shield between said insulation sheaths, including: a tubular housing closed at one end and open at its opposite end, a stake open at both ends, an adapter securing one end of the stake to the open end of the housing to permit the cable to enter within the stake and the housing; means within the housing adjacent the closed end thereof for looping the core of the cable; means within the housing for securing the cable and further means within the housing for grounding the cable, said adapter being in two parts, one part being secured to the stake and the other part secured to the housing and means holding the adapter parts in fluid tight relationship.

12. A pedestal type cable terminal, including: a tubular housing closed at one end and open at its opposite end, a stake having a tubular portion and elongated semi-circular portion, means joining the open end of the housing with the tubular portion of the stake, the interior of the stake and of the housing being in communication, the housing adapted to receive an incoming and an outgoing length of cable of a type in which the core comprises continuous insulated wires surrounded by insulation sheaths and a metallic shield between the insulation sheaths, means within the tubular housing for supporting both lengths of cable and means for supporting a loop of wires of the cable core adjacent the close end of the housing, a terminal block supported within the housing for connection with selected wires of the cable core, means grounding the terminal block and the means for supporting both lengths of cable, and a ground support post longitudinally extending within the stake and the housing and the means supporting the loop of wires comprising an insulated hook secured to the ground support post.

13. The device as set forth in claim 12, and metallic prongs for reception between the insulation sheath and the metal shield of the cable, and means grounding said prongs to the ground post.

14. A pedestal type cable terminal wherein the cable has a core of insulated wires surrounded by insulation sheaths and a metallic shield between said insulation sheaths, including: a tubular housing closed at one end and open at its opposite end, a stake open at both ends, an adapter securing one end of the stake to the open end of the housing to permit the cable to enter within the stake and the housing; means within the housing adjacent the closed end thereof for looping the core of the cable; means within the housing for securing the cable and further means within the housing for grounding the cable, a ground support post extending between the housing and stake, and said adapter having one part allowing the ground support post to pass therethrough and holding the ground support post in position.

(References on following page)

References Cited

UNITED STATES PATENTS

| | | | |
|---|---|---|---|
| 905,347 | 12/1908 | McMeen | 174—44 X |
| 1,987,575 | 1/1935 | Loy | 339—210 X |
| 2,916,539 | 12/1959 | Hamilton | 174—38 |
| 3,153,116 | 10/1964 | Phillips | 174—38 |
| 3,162,718 | 12/1964 | Gunthel | 174—38 |
| 3,164,668 | 1/1965 | Skubal | 174—37 X |
| 3,268,651 | 8/1966 | Stevenson | 174—38 |
| 3,309,456 | 3/1967 | Connell | 174—38 |

LARAMIE E. ASKIN, *Primary Examiner.*

U.S. Cl. X.R.

174—17, 51, 60; 339—14, 198, 210